April 9, 1929.　　　D. DAVIS　　　1,708,216
DIRECTION SIGNAL FOR AUTOMOBILES
Filed Nov. 7, 1928　　　2 Sheets-Sheet 1
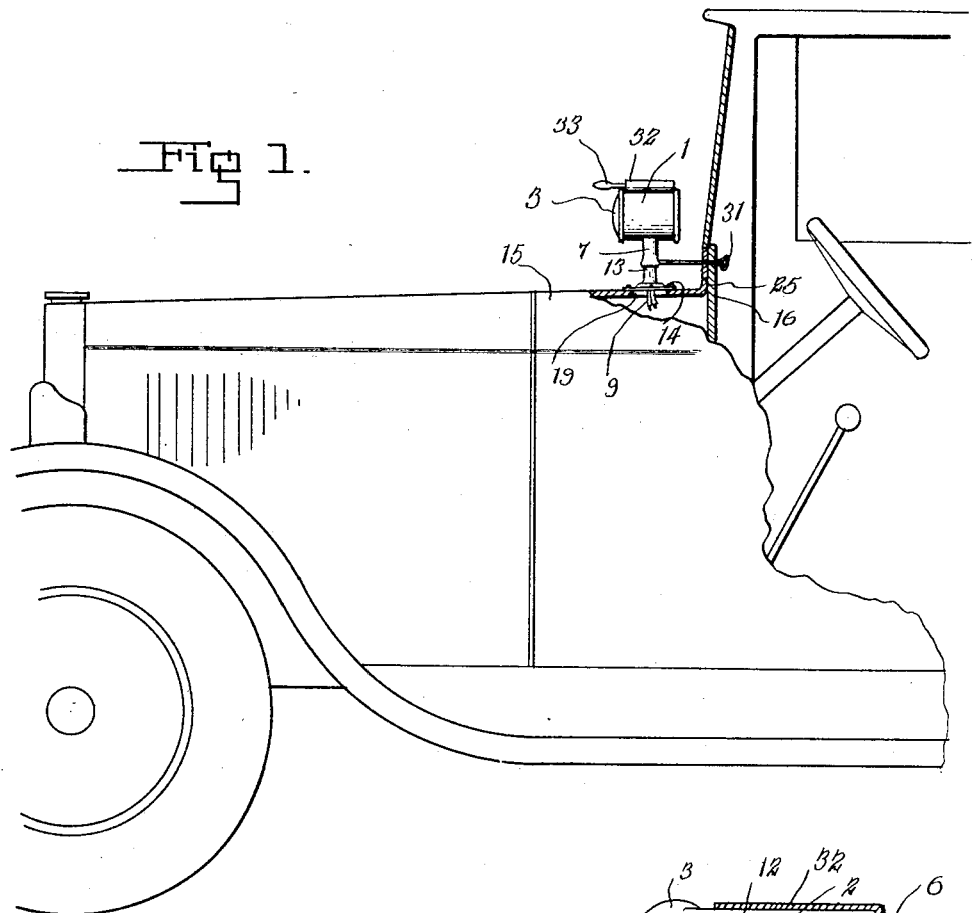
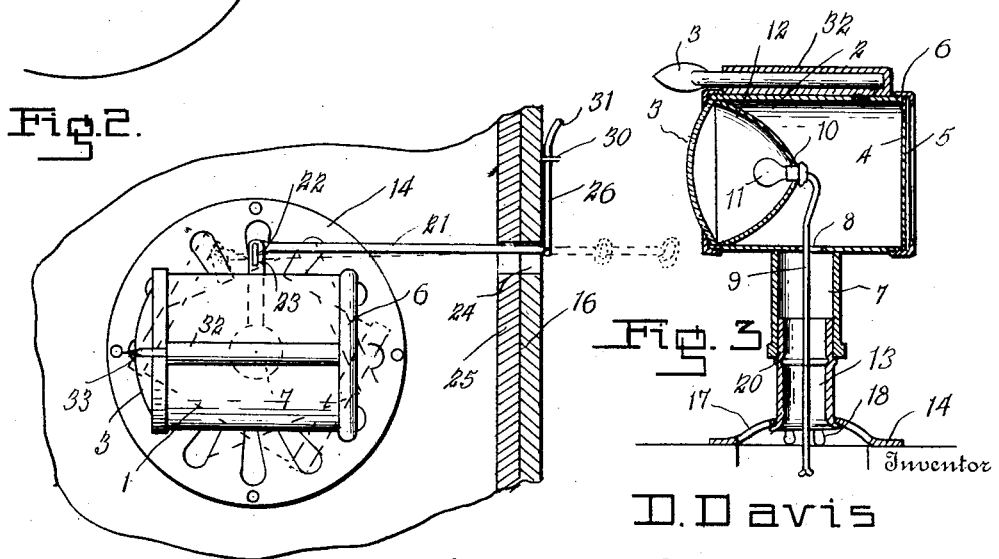
Inventor
D. Davis
By Lacey & Lacey, Attorneys April 9, 1929.  D. DAVIS  1,708,216

DIRECTION SIGNAL FOR AUTOMOBILES

Filed Nov. 7, 1928   2 Sheets-Sheet 2

Inventor
D. Davis
By Lacey & Lacey, Attorneys

Patented Apr. 9, 1929.

1,708,216

UNITED STATES PATENT OFFICE.

DAVID DAVIS, OF DETROIT, MICHIGAN.

DIRECTION SIGNAL FOR AUTOMOBILES.

Application filed November 7, 1928. Serial No. 317,735.

This invention relates to direction signals for use upon automobiles and one object of the invention is to provide a lamp which may be mounted upon the engine hood of an automobile in front of the windshield and turned about a supporting post so that the driver may turn the lamp from a position straight ahead toward the right or left and thereby indicate the direction in which he intends to turn to a traffic officer or other person.

Another object of the invention is to provide the lamp with a supporting post which serves not only as means to rotatably mount the lamp but also constitutes a conduit through which wires supplying current to the bulb of the lamp may pass.

Another object of the invention is to permit the supporting post and its attaching base by means of which it is secured to the engine hood to constitute a ventilator through which warm air may pass out of the engine hood.

Another object of the invention is to provide the lamp with improved means for turning the lamp towards the right or left and releasably securing the lamp in a set position to direct its light straight ahead of the automobile under normal conditions.

The invention is illustrated in the accompanying drawing, wherein

Figure 1 is a view showing the improved signal lamp applied to an automobile, a portion of which is shown principally in side elevation and partially in section;

Fig. 2 is a view showing the improved signal lamp in top plan with the windshield of the automobile in section;

Fig. 3 is a vertical sectional view through the signal lamp;

Figure 5:
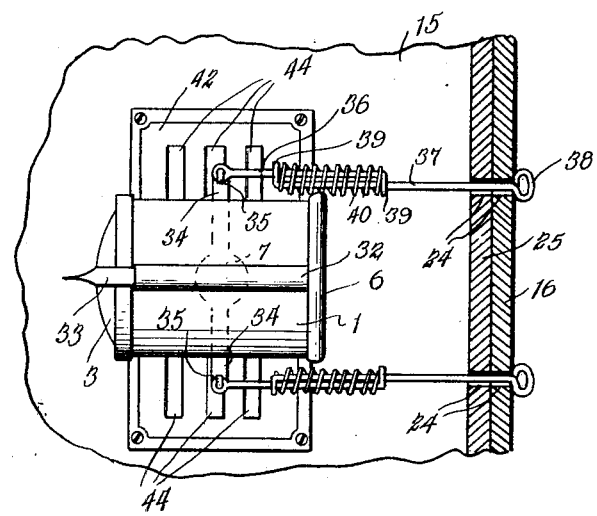
Fig. 5 is a top plan view of a modified form of signal lamp.

The improved signal constituting the subject-matter of this invention includes a lamp 1 having a cylindrical body or casing 2 at the forward end of which is secured a lens 3 in any desired manner. The rear end of the casing is preferably closed by a head 4 and against this closed rear end of the casing is disposed a mirror 5 releasably held in place by a rim 6 which is threaded upon the casing so that if it is not desired to use the mirror the rim and mirror may be removed. This also allows the mirror to be replaced if it should accidentally become broken. The mirror may serve very effectively as a rear view mirror and in view of the fact that the lamp is pivotally mounted, as will be hereinafter brought out, traffic conditions in back of an automobile may be viewed by the driver of the automobile before stopping or making a turn to the right or left. A hollow neck 7 extends downwardly from the casing and this neck is disposed about an opening 8 through which an electric cable 9 is passed so that the wires of the cable may be attached to a socket 10 which carries a bulb 11 and is secured centrally by a reflector 12 mounted in the forward end portion of the casing.

In order to rotatably support the neck, there has been provided a post 13 which is also hollow and extends upwardly from an attaching base 14 through which rivets or other suitable fasteners may be passed in order to firmly secure the base upon the engine hood 15 of an automobile in advance of the windshield frame 16. The central portion 17 of the attaching base immediately surrounding the lower end of the post 13 is pressed upwardly, as shown in Fig. 3, and this upwardly projecting portion of the base is formed with openings 18. It will thus be seen that the perforated portion of the base constitutes a ventilator and allows warm air in the rear portion of the engine hood to pass outwardly through the opening 19 in the hood and out through the openings 18. The opening 19 also constitutes a passage through which the cable 9 passes. In spaced relation to its upper end, the post is formed with an outstanding collar 20 against which the lower end of the neck 7 bears when fitted upon the upper end of the post and, therefore, the neck of the lamp will be properly supported by the post and allowed to turn freely about the same. It will thus be seen that the lamp may be turned from its normal position in which it directs its light straight ahead of the automobile to either the right or the left and, therefore, the lamp may be employed to indicate that the driver of the automobile intends to turn in the direction in which the lamp is turned. The lamp may also be turned to the right or left in order to illuminate a sign at the side of a road.

In order to control movement of the lamp, there has been provided an actuating rod 21 which has one end engaged with a pin 22 extending upwardly from an arm 23 carried by the neck 7 and projecting radially therefrom. This rod extends rearwardly through an opening 24 bored through the windshield frame and upstanding cowl 25 of the engine hood and to the rear end of the rod is hinged a handle bar 26. The hinge connecting the handle bar with the actuating rod consists of a flat strip 27 secured in slits 28 formed in the rod and handle bar by rivets 29 and permits the rod to be swung from a position in alinement with the rod to a folded position transversely thereof in which position the handle bar extends along the inner surface of the windshield frame where it is secured by engagement with a spring clip 30 of a conventional construction. A head or grip 31 is provided at the free end of the handle bar so that it may be easily grasped when the lamp is to be adjusted. A cylindrical socket 32 extends along the top of the lamp 1 and receives a pointer 33 which projects from its open forward end and serves to clearly indicate the direction in which a turn is to be made during the day. A flag may be substituted for the pointer and have its staff fitted into the socket.

When the signal lamp is in use, it is secured upon the engine hood in front of the windshield and the wires 9 passed upwardly through the post and neck into the lamp where they are engaged with the socket 10 carrying the bulb 11. These wires extend through the opening 9 to a suitable source of current, such as a battery. Under normal conditions, the lamp is disposed, as shown in full lines in Fig. 2, and this light will be directed straight ahead of the automobile. When a turn is to be made, the operator of the automobile grasps the handle bar and swings it to the dotted line position of Fig. 2 in which position it will be alined with the rod 21 and by pushing upon the handle bar or drawing upon it the lamp may be swung either toward the right or left. This will indicate that a turn is to be made. After the turn has been made the lamp will be returned to its normal position and the handle bar again swung into engagement with the clip. It will be obvious that by means of its handle bar and actuating rod the lamp may be turned in order to throw its light upon a sign at one side of a road or illuminate a ditch when traveling at night time.

Figure 6:
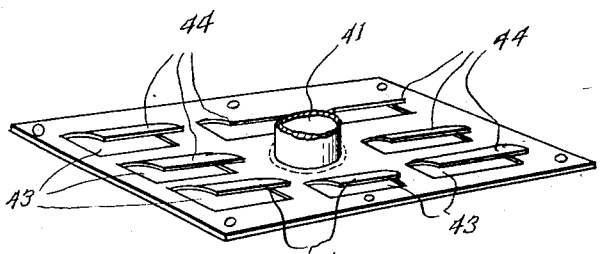
Fig. 6 is a perspective view of the base plate shown in Fig. 5.
Figure 4:
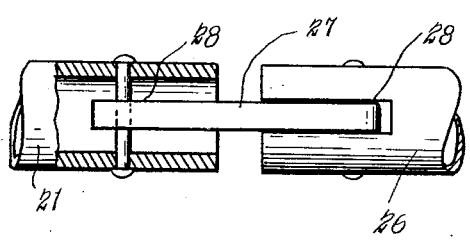
Fig. 4 is an enlarged fragmentary view showing the hinge connecting an actuating rod for the lamp with its handle.

In Figs. 5 and 6, there has been shown a modified form of signal. The lamp shown in Fig. 5 is similar in construction to that shown in Figs. 1, 2 and 3 and provided with a depending neck which instead of being provided with one side arm carries a pair of side arms. These side arms, which are indicated by the numeral 34, extend from opposite sides of the neck 7 of the lamp and at their free ends are formed with pins 35 corresponding to the pins 22. Instead of a single actuating element, there has been provided a pair of actuating elements each of which consists of rods or sections 36 and 37 which extend parallel to each other. The forward rod 36 is formed with an eye at its forward end to receive the pin 35 of the cooperating arm 34 and the rear rod 37 extends through the alined openings in the cowl and instrument board 26 terminates at its rear end in a hand-hold 38 by means of which it may be easily grasped. The rods 36 and 37 are disposed in overlapped relation to each other and each is formed with an eye 39 through which the other rod slidably passes and about the overlapped portions of the rods is disposed a coiled spring 40 which bears against the eyes 39 and yieldably resists movement of the rods away from each other. From an inspection of Fig. 5, it will be readily seen that by grasping the hand-hold of one of the rods 37 a pulling action may be exerted which will compress the spring to its limit of compression and then exert pulling action upon the rod 36 to cause the lamp to swing in the direction in which a turn is to be made. As the lamp turns, the rod 36 of the other actuating element will be drawn forwardly against the action of its spring 40 and since the openings 24 are of sufficient size to prevent binding the rods 37 will be permitted to have sufficient side play to allow the lamp to be easily turned. As soon as the hand-hold is released, the springs will return the lamp and the rods to the normal position shown in Fig. 5.

The post 41, which corresponds to the post 13, and rotatably supports the neck 7 of the lamp extends upwardly from a base plate 42 which is secured upon the engine hood above the opening formed therein but this base plate is flat instead of being bowed upwardly similar to the manner in which the plate 14 is formed and in addition is preferably rectangular in shape instead of circular. Tongues are struck from the plate 42 and bent upwardly, thereby providing openings 43 corresponding to the openings 18. The tongues when bent upwardly extend rearwardly over the openings and provide guards or shields 44 which serve to prevent rain or snow from passing inwardly through the openings 43 and in addition serve to cause air currents passing the openings when an automobile is in motion to create a suction through the openings and thereby cause warm air to readily pass out of the engine hood.

Having thus described the invention, I claim:

1. In combination with a vehicle including an engine hood and a windshield frame extending upwardly from the rear of the hood and having an opening formed therein, the hood having an opening therein forwardly from the windshield, a hollow post having a base about its lower end secured upon the hood with the post disposed over the opening and the portion of the base adjacent the post spaced upwardly from the hood and formed with ventilating openings, a signal light, a hollow neck extending downwardly therefrom and rotatably engaged with said post, an arm projecting radially from said neck, a pin carried by said arm, a rod loosely engaged with said pin and extending rearwardly through the opening in said windshield frame, a handle bar hinged to the rear end of said rod for swinging movement from a position in alinement with the rod to a folded position transversely thereof against the rear face of the windshield frame, a head at the free end of said handle bar, and means carried by the windshield frame to releasably retain the handle bar in its folded position.

2. In combination with a vehicle including an engine hood and a windshield frame extending upwardly from the rear of the hood and having an opening formed therein, the hood having an opening therein forwardly from the windshield, a hollow post having a base about its lower end secured upon the hood with the post disposed over the opening, a signal light having a depending neck rotatably engaged with said post, an arm projecting transversely from said neck, a rod pivotally connected with said arm and projecting rearwardly therefrom through the opening in the windshield frame, a handle bar hinged to said rod for swinging movement from a position in alinement therewith to a folded position transversely thereof against the windshield frame, and means to releasably retain said handle bar in a folded position.

3. In combination with a vehicle including an engine hood and a windshield frame extending upwardly from the rear of the hood and having an opening formed therein, the hood having an opening therein forwardly from the windshield, a hollow post having a base about its lower end secured upon the hood with the post disposed over the opening, a signal having a depending neck rotatably engaged with said post, and means for turning the signal about the post including an element extending rearwardly from the signal through the opening in the windshield frame.

4. In combination with a vehicle including an engine hood and a windshield frame extending upwardly from the rear of the hood and having an opening formed therein, the hood having an opening therein forwardly from the windshield, a hollow post having a base about its lower end secured upon the hood with the post disposed over the opening, the base having ventilating openings formed therein, a signal light having a depending neck rotatably engaged with said post, and means for turning the signal light about the post including an actuating rod extending rearwardly from the signal light through the opening in the windshield frame and a handle pivoted to the rear end of said rod for movement transversely thereof from a position in alinement with the rod to a folded position transversely of the rod.

5. A direction signal for vehicles comprising a post adapted to be secured in an upright position upon an engine hood in front of a windshield, a signal having a depending neck rotatably engaged with said post, an arm projecting transversely from said neck, an actuating rod pivoted to said arm for projecting rearwardly therefrom, a handle bar hinged to the rear end of said rod for swinging from a position in alinement with the rod to a position transversely thereof, and means to releasably secure the handle bar in a position transversely of the actuating rod.

6. A direction signal for vehicles comprising a post adapted to be secured in an upright position upon an engine hood in front of a windshield, said post being hollow and having an attaching base at its lower end pressed upwardly about the post to support the post in an elevated position and formed with ventilating openings about the post, a signal having a depending hollow neck rotatably carried by said post, an arm projecting transversely from said neck, an actuating arm pivotally connected with said arm for horizontal swinging movement relative thereto, and a handle bar hinged to said rod for horizontal swinging movement.

7. A direction signal for vehicles comprising a post adapted to be secured in an upright position upon an engine hood in front of a windshield, said post being hollow and having an attaching base at its lower end pressed upwardly about the post to support the post in an elevated position and formed with ventilating openings about the post, a signal lamp rotatably carried by said post, a mirror carried by said lamp at its rear end, and means for turning said lamp about said post.

8. A direction signal for vehicles comprising a lamp, means to pivotally mount said lamp for turning in a horizontal plane, a socket carried by said lamp and extending longitudinally thereof and open at its forward end, a pointer removably fitted into said socket and projecting forwardly from the lamp, and means for turning said lamp.

9. A direction signal for vehicles comprising a post adapted to be secured in an upright position upon an engine hood in front of a windshield, said post being hollow and having an attaching base at its lower end pressed upwardly about the post to support the post in an elevated position and formed with ventilating openings about the post, a signal having a depending hollow neck rotatably carried by said post, and means for rotating the neck about the post to turn the signal horizontally.

In testimony whereof I affix my signature.

DAVID DAVIS. [L. S.]